(12) United States Patent
Light et al.

(10) Patent No.: US 7,064,669 B2
(45) Date of Patent: Jun. 20, 2006

(54) ELECTRONIC TETHER FOR PORTABLE OBJECTS

(76) Inventors: Elliott D. Light, 12 Bentana Way, Rockville, MD (US) 20850; Brian Boesch, 2939 Fort Lee St., Oak Hill, VA (US) 20171; Jon L. Roberts, 529 Clear Spring Rd., Great Falls, VA (US) 22066

( * ) Notice: Subject to any disclaimer, the term of this patent is extended or adjusted under 35 U.S.C. 154(b) by 169 days.

(21) Appl. No.: 10/832,498

(22) Filed: Apr. 27, 2004

(65) Prior Publication Data
US 2005/0139168 A1   Jun. 30, 2005

Related U.S. Application Data

(63) Continuation-in-part of application No. 09/591,167, filed on Jun. 9, 2000, now Pat. No. 6,748,902.

(51) Int. Cl.
G08B 23/00 (2006.01)
(52) U.S. Cl. .............. 340/573.1; 340/539.11; 340/573.3; 367/127; 367/128
(58) Field of Classification Search .. 340/573.1–573.4, 340/572.1, 539.15, 539.1, 539.12, 539.14, 340/568.1–572; 119/421, 721, 908, 539.14; 367/118, 124, 125, 127
See application file for complete search history.

(56) References Cited

U.S. PATENT DOCUMENTS

| | | |
|---|---|---|
| 4,335,682 A | 6/1982 | Gonda et al. |
| 4,675,656 A | 6/1987 | Narcisse |
| 4,792,796 A | 12/1988 | Bradshaw et al. |
| 4,802,482 A | 2/1989 | Gonda |
| 4,898,120 A | 2/1990 | Brose |
| 4,918,425 A | 4/1990 | Greenberg et al. |
| 5,054,428 A | 10/1991 | Farkus |
| 5,067,441 A | 11/1991 | Weinstein |
| 5,204,657 A | 4/1993 | Prosser |
| 5,223,815 A | 6/1993 | Rosenthal et al. |
| 5,331,602 A * | 7/1994 | McLaren ................... 367/6 |
| 5,353,744 A | 10/1994 | Custer |
| 5,381,129 A | 1/1995 | Boardman |
| 5,425,330 A | 6/1995 | Touchton et al. |
| 5,461,365 A | 10/1995 | Schlager et al. |
| 5,465,687 A | 11/1995 | Custer |
| 5,477,210 A | 12/1995 | Belcher |
| 5,533,469 A | 7/1996 | Touchton et al. |

(Continued)

OTHER PUBLICATIONS

Rob Harrill, "A watch that's smarter than you?", http://www.eurekalert.org/pub_releases/2004-10/uow-awt100604.php, Oct. 6, 2004.

(Continued)

Primary Examiner—Daniel Wu
Assistant Examiner—Jennifer Mehmood
(74) Attorney, Agent, or Firm—Roberts, Abokhair & Mardula, LLC (57) ABSTRACT

A system and method for issuing an alarm when the separation distance between a monitoring module associated with an object (animate or inanimate) and an alert module exceeds a preset threshold distance thereby forming a leadless electronic tether between the object and the object owner. A monitoring module comprises a portable transmitter provides a signal to an alert module comprising a receiver and a processor. The alert module is adapted to determine a separation distance between the monitoring module and the alert module based on an attribute of the signal. When the separation distance exceeds a predetermined threshold, the alert module issues an alert.

30 Claims, 5 Drawing Sheets

U.S. PATENT DOCUMENTS

| | | | |
|---|---|---|---|
| 5,605,116 A | 2/1997 | Kim et al. | |
| 5,638,050 A | 6/1997 | Sacca | |
| 5,642,690 A | 7/1997 | Calabrese et al. | |
| 5,646,593 A | 7/1997 | Hughes et al. | |
| 5,648,757 A | 7/1997 | Vernace | |
| 5,686,891 A | 11/1997 | Sacca | |
| 5,781,102 A | 7/1998 | Huang | |
| 5,790,021 A | 8/1998 | Mickel | |
| 5,844,489 A | 12/1998 | Yarnall | |
| 5,857,433 A | 1/1999 | Files | |
| 5,868,100 A | 2/1999 | Marsch | |
| 5,870,029 A * | 2/1999 | Otto et al. | 340/825.36 |
| 5,870,973 A | 2/1999 | Touchton | |
| 5,939,988 A | 8/1999 | Neyhart | |
| 5,977,913 A | 11/1999 | Christ | |
| 6,011,471 A | 1/2000 | Huang | |
| 6,019,066 A | 2/2000 | Taylor | |
| 6,047,664 A | 4/2000 | Lyerly | |
| 6,064,308 A | 5/2000 | Janning | |
| 6,064,309 A * | 5/2000 | Sellers et al. | 340/573.6 |
| 6,075,443 A | 6/2000 | Schepps et al. | |
| 6,097,301 A * | 8/2000 | Tuttle | 340/693.9 |
| 6,131,535 A | 10/2000 | So | |
| 6,135,060 A | 10/2000 | So | |
| 6,155,208 A | 12/2000 | Shell | |
| 6,163,261 A | 12/2000 | Westrick | |
| 6,166,635 A | 12/2000 | Huang | |
| 6,166,643 A | 12/2000 | Janning | |
| 6,167,843 B1 | 1/2001 | Kim | |
| 6,169,484 B1 | 1/2001 | Schuchman et al. | |
| 6,170,439 B1 | 1/2001 | Duncan | |
| 6,184,790 B1 | 2/2001 | Gerig | |
| 6,191,693 B1 | 2/2001 | Sangsingkeow | |
| 6,230,660 B1 | 5/2001 | Greeson | |
| 6,246,322 B1 * | 6/2001 | LeDain et al. | 340/531 |
| 6,265,975 B1 * | 7/2001 | Zimmerman | 340/571 |
| 6,392,547 B1 * | 5/2002 | Stewart et al. | 340/573.1 |
| 6,405,132 B1 | 6/2002 | Breed | |
| 6,412,813 B1 | 7/2002 | Breed | |
| 6,442,510 B1 * | 8/2002 | Klefenz | 702/189 |
| 6,512,455 B1 * | 1/2003 | Finn et al. | 340/572.1 |
| 6,529,131 B1 | 3/2003 | Wentworth | |
| 6,577,238 B1 | 6/2003 | Whitesmith | |
| 6,600,422 B1 | 7/2003 | Barry | |
| 6,674,364 B1 | 1/2004 | Holbrook | |
| 6,686,881 B1 | 2/2004 | Lu | |
| 6,687,609 B1 | 2/2004 | Hsiao | |
| 6,720,920 B1 | 4/2004 | Breed | |
| 6,721,681 B1 * | 4/2004 | Christian et al. | 702/178 |
| 6,820,897 B1 | 11/2004 | Breed | |
| 6,837,427 B1 | 1/2005 | Overhultz | |
| 6,917,291 B1 | 7/2005 | Allen | |
| 2002/0198632 A1 | 12/2002 | Breed | |
| 2003/0233189 A1 | 12/2003 | Hsiao | |

OTHER PUBLICATIONS

Suresafe Technology Inc. Product Description, http://www.suresafe.com.

TrackIT Corp. Product Description; "Mobile Security Goes High Tech", http://www.trackitcorp.com.

* cited by examiner

ELECTRONIC TETHER FOR PORTABLE OBJECTS

CROSS REFERENCE TO RELATED APPLICATIONS

This application is a continuation in part of application Ser. No. 09/591,167, filed Jun. 9, 2000, now U.S. Pat. No. 6,748,902. The Ser. No. 09/591,167 application is incorporated herein by reference in its entirety for all purposes.

BACKGROUND

This invention relates generally to monitoring animals and inanimate objects. More particularly the present invention is a form of electronic leash for animals and an electronic "tether" for portable objects carried by individuals.

Animals and portable objects share a common attribute: they can both be lost if care is not taken to be constantly aware of their location. For example, a household pet may quickly wander from its owner at a park or other area if not secured by a leash. A camera bag may be easily left at a restaurant if not secured by a shoulder strap or other "tether."

In the field of animal training, various devices have been invented which are designed to keep animals within a confined area. For example the now ubiquitous "electronic fence" is seen everywhere as a means of keeping animals within a specific area. The electronic fence comprises a wire surrounding an area in which an animal is to be confined. An electronic current placed on the wire giving it a magnetic field and/or the wire is used as an RF transmitter. A collar is then attached to the animal which is capable of sensing the electronic field. When the strength of the electronic field is at a certain level, an audible warning is given to the animal. As the animal gets closer to the buried wire, an electronic shock is administered to the animal thereby providing a physical incentive for the animal to stay away from the buried electrical wire. Over a training period of time, the animal become becomes familiar with the meaning of the audible sound and the general location of the buried wire. In this fashion the animal is trained to stay within a confined area by virtue of the audible signal and the electronic shock in the event that the animal gets too close to the buried wire.

Much of the background art discloses animal collars and their circuitry, means for applying electrical shocks and audible stimuli to the animal worn device, a wide variety of "buried wire" systems together with associated stationary transmitters. Further, several instances of portable transmitters are also illustrated for control of GPS, and for allowing animal trainers to administer shocks to animals when desired. Much of the circuitry in the references cited will be known by those skilled in the art to be applicable to the present invention.

However, animal owners cannot carry a buried wire wherever they go. On the other hand, animals are enriched by being allowed to run free under the guidance of their owners. Diligence is required to be certain that the animal does become separated from its owner beyond a comfortable distance.

With respect to objects, such as cameras, key chains, purses, and the like, diligence is required to keep track of where an object is placed to be certain it is not left behind when the owner moves to another location. Diligence is also required to be certain that an object is not intentionally or accidentally taken by a third party. While mechanical tethers can be attached between objects and the owners of the objects, it is not always possible to leave these mechanical tethers in place while performing normal activities.

There have been several devices heretofore known that have attempted to solve the problem of locating lost or misplaced items. The following prior art devices relate to systems and devices for object finding: A product marketed as the Magnavox remote locater; a product marketed as the Brookstone SmartFind remote control key finder; U.S. Pat. Nos. 5,638,050 and 5,686,891 relating specifically to a locating system for a remote control having a "home base"; and U.S. Pat. Nos. 5,204,657; 5,648,757 and 5,790,021. These prior known devices have suffered from one or more of several deficiencies.

With one recent exception, previous devices are single-use devices where only one object could be located with the system. The one recent exception is the Brookstone product that allows users to locate up to two objects. This system will not allow the user to keep track of more than two items. Also, this product only provides for key chain attachment, and does not allow for a more permanent and secure attachment to a variety of other commonly misplaced items, such as remote-control devices, cell phones, PDA's, pagers, electronic devices, etc. This, product also suffers from the multiple system interference problem described below, and also does not provide any means to prevent the misplacement of the transmitter itself. U.S. Pat. No. 6,674,364 sought to remedy these deficiencies by providing means for locating multiple devices.

Finding an object requires there be some perception that the object is missing. In the case of valuable objects, the delay in perception may be costly. How many times does a person notice many hours later, that a purse or other object has been left at a store or restaurant? By that time, the object may be out of range of the finding device, either because the owner has left the vicinity of the object or the object has been removed from the vicinity of the owner.

What would be truly useful would be a system that comprises an "electronic leash" or "electronic tether" which can be variably preset by an animal or object owner and operated so as to prevent the animal or object from becoming separated from its owner.

SUMMARY

Embodiments of the present invention provide systems and methods for issuing an alarm when the separation distance between a monitoring module associated with an object (animate or inanimate) and an alert module exceeds a preset threshold distance thereby forming an electronic tether between the object and the object owner.

It is therefore an aspect of the present invention to issue an alert to an object owner when the owner leaves an object behind.

It a further aspect of the present invention to issue an alert to an object owner when the object is separated from the object owner.

It is yet another aspect of the present invention to form an electronic tether between an owner of one or more objects and the objects without the need for a physical connection between the owner and the objects.

These and other aspects of the present invention will become apparent from the general and detailed descriptions that follow.

The present invention comprises an electronic tether comprising an alert module and a monitoring module. The monitoring modules (signal sources) are minimally sized so they can be attached, placed inside or incorporated into a variety of objects such as PDA's, cell phones, pagers, camera bags, purses, diaper bags, key chains, backpacks, etc. Each monitoring module comprises an addressable signal generator. By way of illustration and not as a limitation, the signal generator may produce an RF signal, an audio signal, or a magnetic field signal. The signal generator address may be preset or settable using means known in the art. The signal generator address associates the signal generator in the monitoring module with a monitored device in the alert module.

In an embodiment of the present invention, when a monitoring module is first powered on, the alert module "learns" the signal generator address using means known in the art. By way of example and not as a limitation, a monitored device on the owner alert device is selected and the monitoring module is placed in close proximity to the owner alert device. A "learn" button is pressed on the owner alert device and the address of the signal generator is saved and associated with the selected monitored device. Thereafter, when the owner leaves the area in which a monitored device is located, an alert is generated to the owner, which may be audible, visual, or tactile (as in the case of a vibrating device) to tell the owner he/she has left the monitored object behind. Corrective action to retrieve the device can then be taken. Similarly, if a monitored device is surreptitiously taken (as in a stolen handbag or camera), the increasing distance from the owner will cause an alert to be given to the owner to potentially thwart any theft.

DETAILED DESCRIPTION

Embodiments of the present invention provide systems and methods for issuing an alarm when the separation distance between a monitoring module associated with an object (animate or inanimate) and an alert module exceeds a preset threshold distance thereby forming a leadless electronic tether between the object and the object owner.

The Ser. No. 09/591,167 application as incorporated herein by reference describes an animal training device comprising a power supply and a microprocessor. The microprocessor comprises processing capability and storage of variable parameters. The variable parameters are input by a variable setting means that can be a dial, digital setting or other types of setting means known in the art. When the trainer desires to set a specific radius distance, such as a distance in input in the variable setting thus providing instructions to the processor. Once the processor receives settings on the desired radius distance, the signal is sent to the transmitter to apply the appropriate power to the transmission as instructed by the processor. A signal is then transmitted that can be received by an animal device. Depending upon the radius distance set by the trainer, the transmitted signal will be stronger or weaker as desired.

The animal device is a self-contained unit that is worn on a collar or other attachment to the animal. The animal device receives the signal from the training device via an antenna. The antenna is connected to an internal receiver that has the capability of receiving and digitizing the signal strength so that the signal strength can be determined. Once the signal strength is determined it is provided to a microprocessor in the animal device. Microprocessor interprets the signal strength and, depending upon the level of the signal strength, sends a signal to an audible alarm which in turn powers a speaker that provides an audible signal to the animal when the signal strength is at some intermediate or warning level.

In an alternative embodiment presented in the Ser. No. 09/591,167 application the variable setting is established by virtue of setting a radius distance on the animal device rather than on the training device. In this embodiment, the training device architecture is simplified by eliminating the variable power setting in the transmitter. This embodiment of the training device comprises a power supply connected to a transmitter and an antenna.

The present invention utilizes an embodiment of the animal device (comprising a receiver) as an alert module and the simplified training device (comprising a signal generator) as the monitoring module. Together, these components provide an electronic tether.

Figure 1:
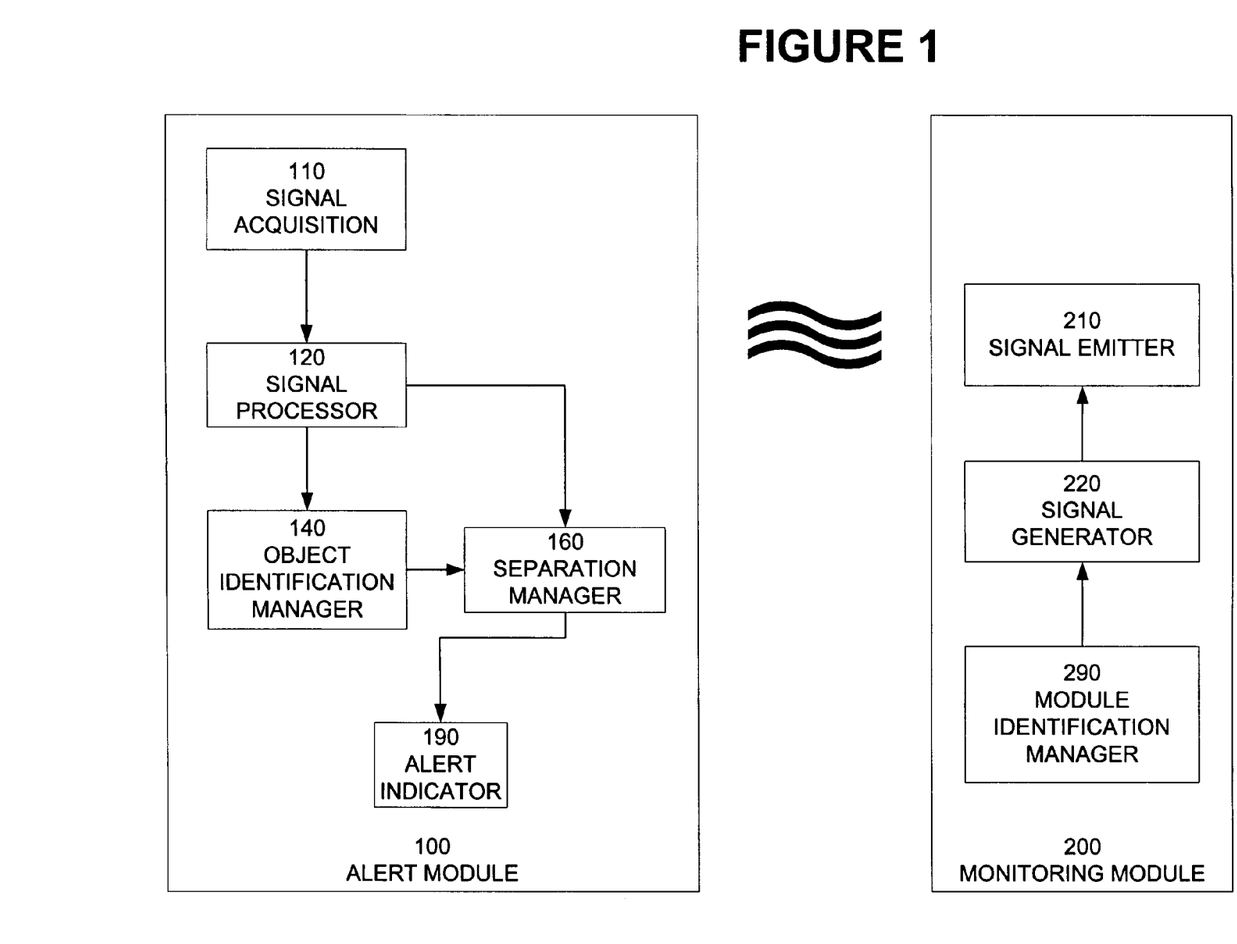
FIG. 1 illustrates the logical elements of a leadless electronic tether according to embodiments of the present invention.

FIG. 1 illustrates the logical elements of a leadless electronic tether according to embodiments of the present invention.

Referring to FIG. 1, an alert module 100 comprises a signal acquisition element 110, a signal processor 120, an object identification manager 140, a separation manager 160 and an alarm 190. The monitoring module 200 comprises a signal emitter 210, a signal generator 220, and module identification manager 290. In an embodiment of the present invention, the signal generator is adapted to emit a burst signal (in contrast to a continuous signal).

Signal acquisition element 110 receives the signal emitted by signal emitter 210. The signal acquisition element 110 comprises a device or devices appropriated to receive the signal generated by the signal generator 220. Signal emitter 210 receives the signal from signal generator 220. The signal comprises a monitoring module identifier provided by module identification manager 290. Referring again to the alert module 100, the signal from the signal acquisition element 110 is received and processed by signal processor 110. The processed signal is sent from signal processor 120 to an object identification manager 140 to obtain the monitoring module identifier. The signal is also provided to separation manager 160 to determine if the distance between the monitoring module and the alert module exceeds a preset separation distance. If the preset separation distance is exceeded, the separation manager sends an alert signal to alert indicator 190. In an embodiment of the present invention, the alert indicator 190 comprises an audible alarm and a visual indicator that identifies the particular monitoring module 200 that has exceed the preset separation distance. By way of illustration and not as a limitation, the visual indicator may be a LED indicator and/or an LCD display. In yet another embodiment, the alert indicator 190 comprises a voice synthesizer that announces that a tagged object has been left behind. Optionally, the tagged object is identified by name or a descriptor.

In an alternate embodiment (not illustrated), the object identification manager 140 and module identification manager 290 are not used. In this embodiment, the alert indicator is an audible alarm.

The logical elements illustrated in FIG. 1 are implemented by various embodiments of the present invention as will be described below. The embodiments described herein are exemplary only and are not intended to limit the present invention. As will be appreciated by those skilled in the art other means may be used to perform the tasks assigned to the logical elements without departing from the scope of the present invention.

Figure 2A:
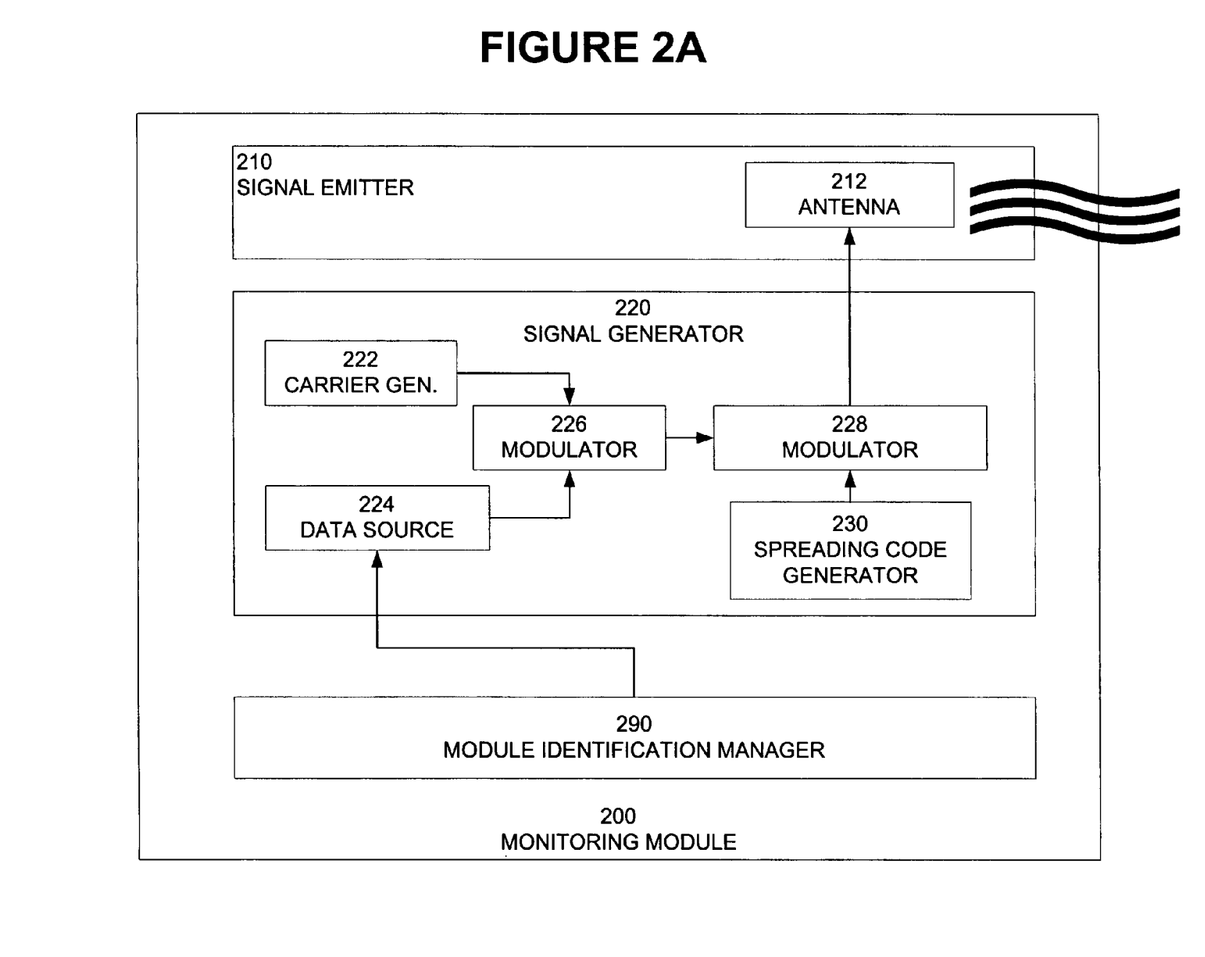
FIGS. 2A and 2B illustrate an electronic tether that uses a spread spectrum signal according to embodiments of the present invention.
Figure 2B:
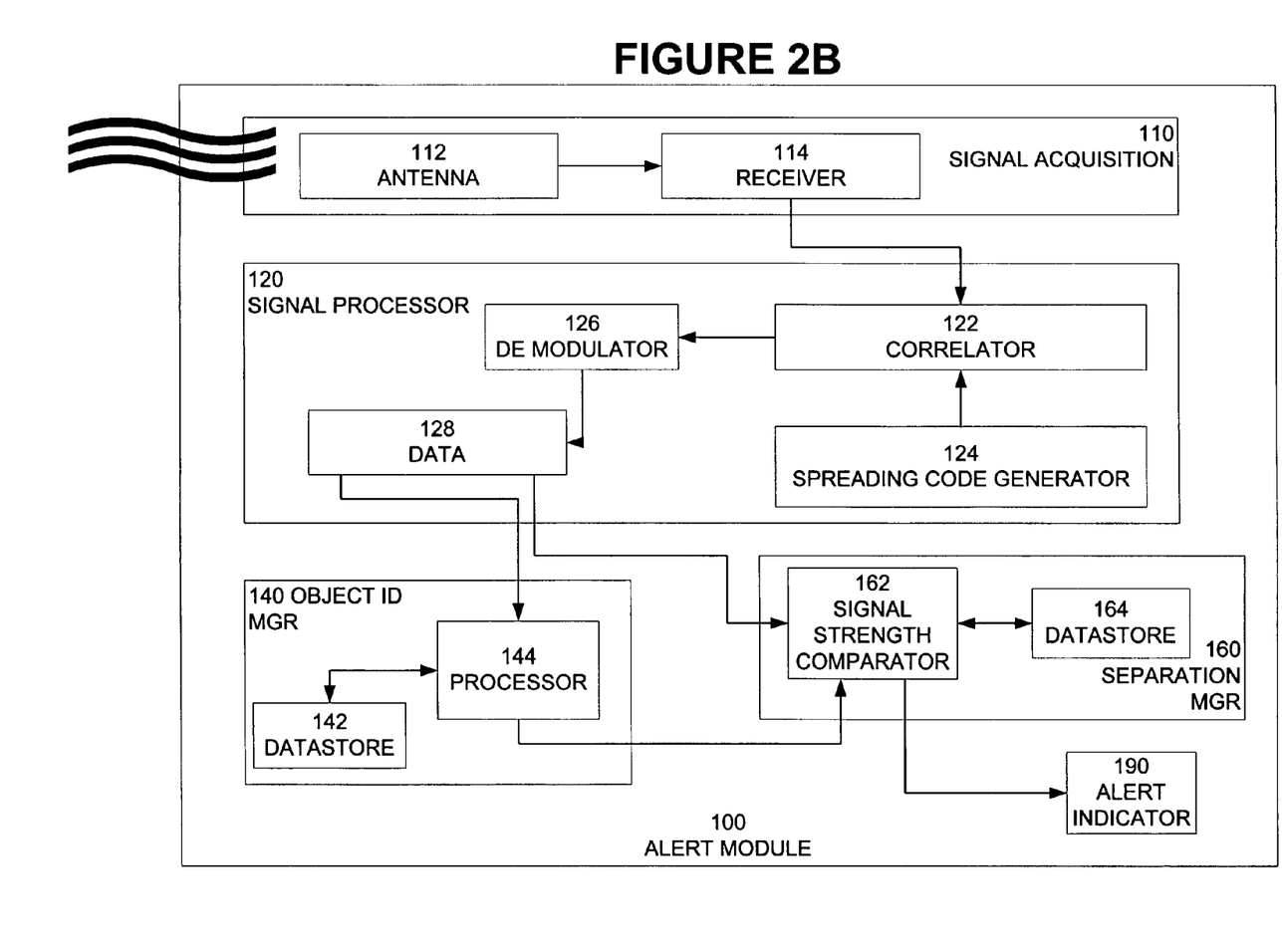

FIGS. 2A and 2B illustrate a leadless electronic tether that uses a spread spectrum signal according to embodiments of the present invention. Referring to FIG. 2A, a monitoring module 200 comprises a signal generator 220. Signal generator 220 comprises carrier generator 222 and data source 224. A signal from data source 224 is modulated by modulator 226 using a carrier signal from carrier generator 222. Modulator 228 using a spreading code signal produced by spreading code generator 230 then modulates the modulated data signal. The resulting spread spectrum signal is sent to signal emitter 210 and more specifically to antenna 212.

FIG. 2B illustrates an alert module 100 according to embodiments of the present invention. Signal acquisition element 110 comprises an antenna 112 and a receiver 114. The output of the receiver is a signal that is de-spread by correlator 122 using the same spreading code used by to spread the signal. This spreading code signal is produced by spreading code generator 124. The output of the correlator is demodulated by demodulator 126 to produce the original data stream 128 sent by monitoring module 200.

The data stream is sent to processor 144 where the module identifier code in the data stream is reconstructed and matched against tagged objects registered in datastore 142. The data stream is also sent to signal strength comparator 162 to determine whether the signal strength has decreased against a baseline stored in datastore 164 for the tagged object identified by the object identification manager 140. If a decrease is detected, the signal strength comparator determines whether the change exceeds a pre-determined threshold. In the event the signal strength has decreased by an amount exceeding the pre-determined threshold, an alert is sent to alert indicator 190.

The monitoring module 200 (FIG. 2A) comprises an address that is maintained by module identification manager 290 and received by data source 224. During an initialization process, object identification manager 140 associates an address of a particular monitoring module 200 with a tagged object (not shown) to which the monitoring module has been physically connected or in which the monitoring module has been incorporated. Referring also to FIG. 2B, during a monitoring session, the object identification manager 140 associates a processed signal from signal processor 120 with the tagged object associated with a particular monitoring module 200.

Prior to initiation of a monitoring session, alert module 100 initializes a signal strength from monitoring module 200. In an embodiment of the present invention, during this initialization process, the alert module 100 is placed at a maximum acceptable separation distance from monitoring module 200. Upon the start of the monitoring session, alert module separation manager receives a monitored signal having a signal strength that is indicative of a distance between the monitoring module and the alert module. If the signal strength of the monitored signal decreases below a threshold value (relative to the maximum separation distance established during initialization), separation manager 160 issues instructions to alert module 190.

Figure 3A:
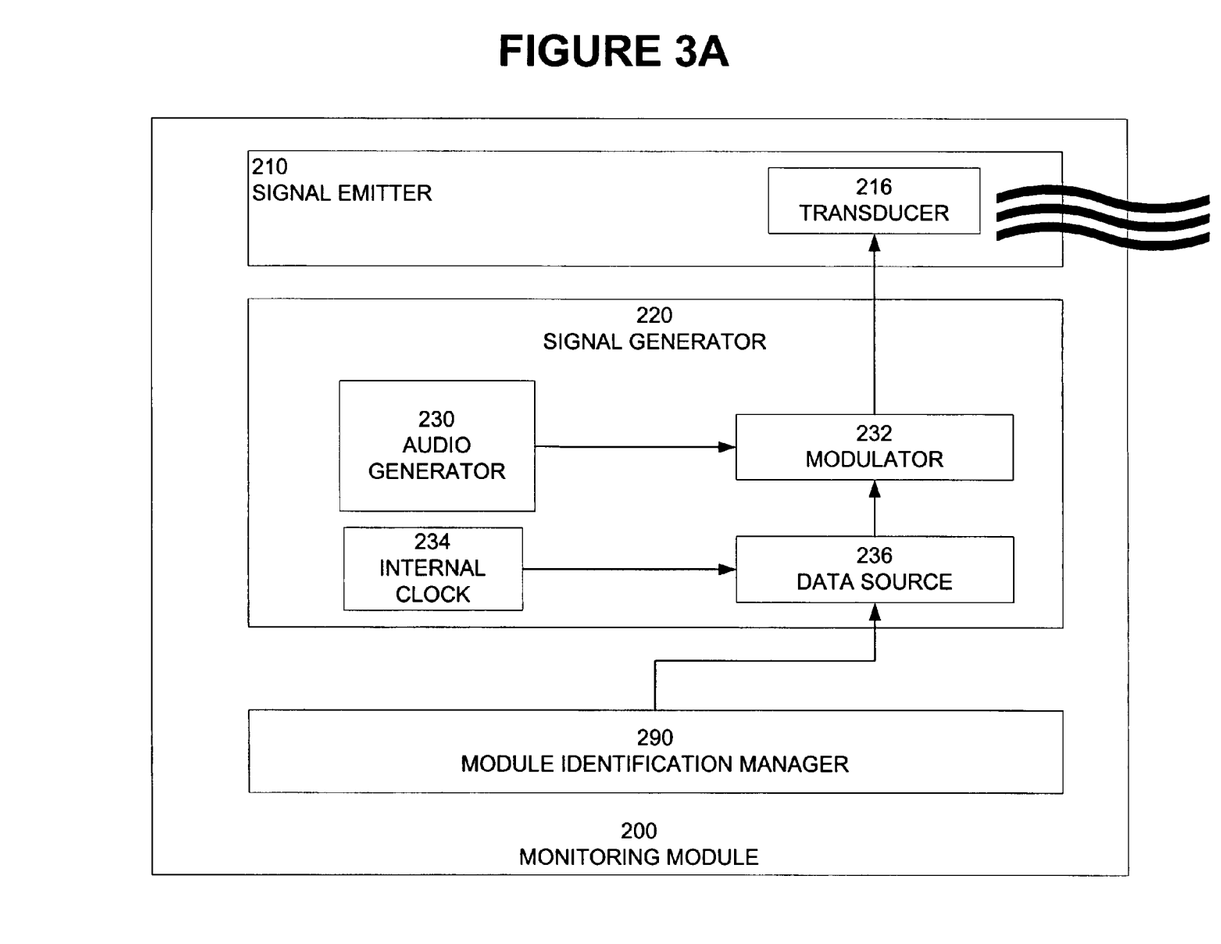
FIGS. 3A and 3B illustrate an electronic tether that uses an audio signal according to embodiments of the present invention.
Figure 3B:
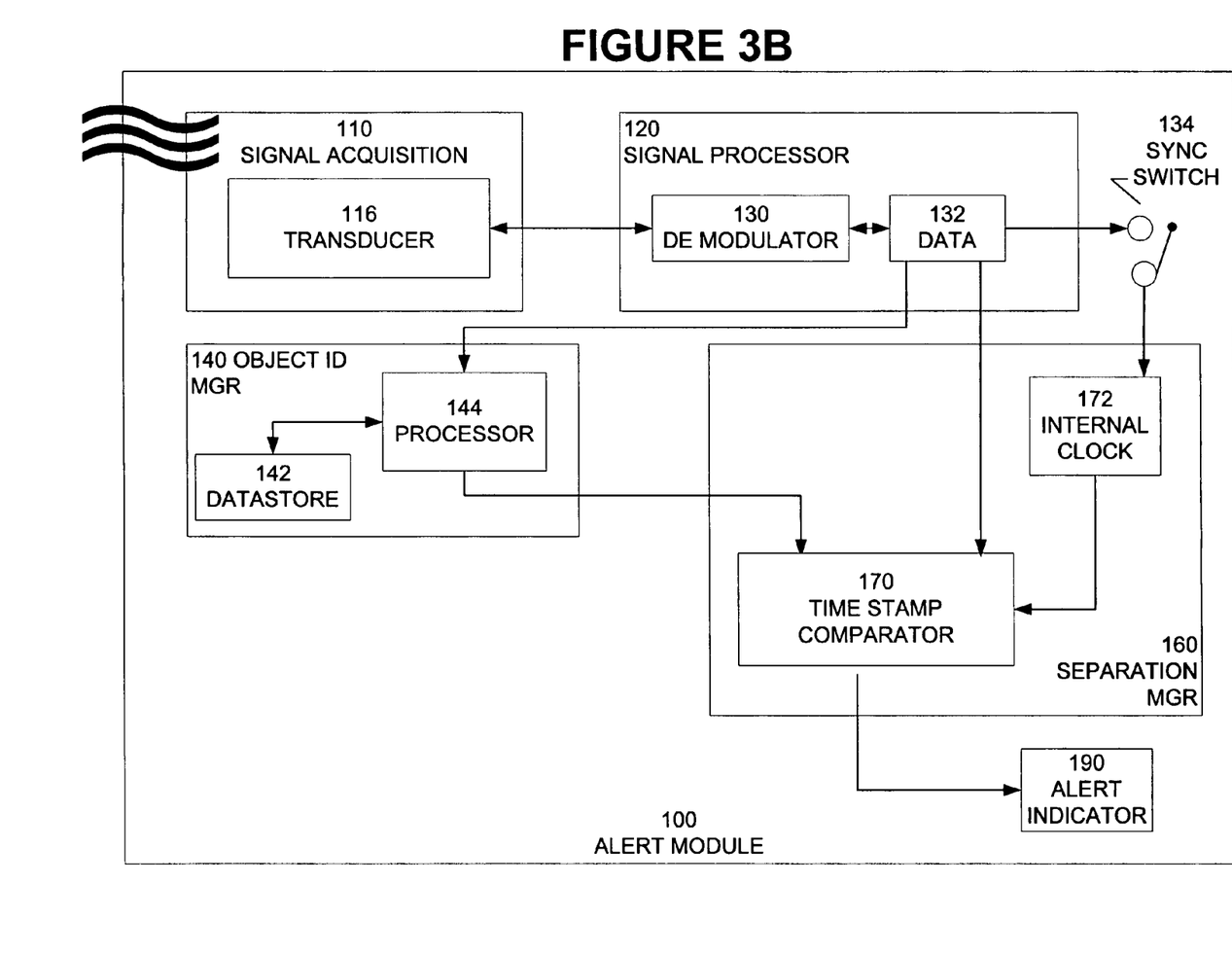

FIGS. 3A and 3B illustrate a leadless electronic tether that uses an audio signal according to embodiments of the present invention. Referring to FIG. 3A, a monitoring module 200 according to embodiments of the present invention is illustrated. A signal generator 220 comprises an audio generator 230, an internal clock 234, a data source 236 and a modulator 232. Modulator 232 receives a high frequency audio carrier from audio generator 230 and modulates the carrier with a data stream received from data source 236. The data stream comprises a monitoring module identifier from module identification manager 290 and a timestamp from internal clock 234. The resultant electrical signal is sent to transducer 216 where it is converted to a high frequency audio signal.

Referring to FIG. 3B, an alert module 100 is illustrated according to embodiments of the present invention. Signal acquisition element 110 comprises a transducer 116 that is adapted to receive the high frequency audio signal and convert that signal to an electrical signal. Signal processor 120 comprises a demodulator 130 demodulates the electrical signal to obtain the information encoded in the audio signal in the form of a data stream 132.

The data stream is sent to processor 144 where the module identifier code in the data stream is reconstructed and matched against tagged objects registered in datastore 142. The data stream is also sent to timestamp comparator 170 to that compares the timestamp of the monitoring module against a baseline timestamp stored in datastore 142 for the tagged object identified by the object identification manager 140.

The monitoring module 200 comprises an address that is maintained by module identification manager 290 and conveyed by signal generator 220 to the alert module 100. During an initialization process, object identification manager 140 associates an address of a particular monitoring module 200 with a tagged object (not shown) to which the monitoring module has been physically connected or in which the monitoring module has been incorporated. During a monitoring session, the object identification manager 140 associates a processed signal from signal processor 120 with the tagged object associated with a particular monitoring module 200.

Separation manager 160 comprises an internal clock. Prior to initiation of a monitoring session, alert module 100 receives an initialization timestamp from monitoring module 200. A clock in separation manager 160 associated with monitoring module 200 is synchronized with the initialization timestamp time via synchronization switch 134. In an embodiment of the present invention, during this synchronization processes, the alert module 100 is place proximate to monitoring module 200 to minimize the transit delay resulting from the passing of the audio signal through space.

The processed signal from signal processor 120 is evaluated by separation manager 160 to determine if a tagged object is no longer within a predetermined distance of the monitoring module. Upon the start of the monitoring session, timestamp comparator 170 receives a current timestamp from monitoring module 200 that reflects the incremental time that has passed since the synchronization process was completed plus the transit time of the audio signal through space. This transit time is reliably indicative of the distance between the monitoring module 200 and the alert module 100. Timestamp comparator 170 subtracts time indicated by the internal clock 172 in separation manager 160 associated with monitoring module 200 from the current timestamp and compares the difference to separation threshold value. If the time difference exceeds the threshold value, timestamp comparator 170 issues instructions to alert indicator 190.

The embodiments described herein are exemplary only and are not intended to limit the present invention. As will be appreciated by those skilled in the art other means may be used to perform the tasks assigned to the logical elements without departing from the scope of the present invention. By way of illustration and not as a limitation, monitoring module 200 comprises a passive responder that responds with a signal burst when queried by alert module 100. In this embodiment of the present invention, alert module 100 comprises an alerting means that queries monitoring module 200.

Systems and methods for providing an electronic tether have been illustrated. It will be understood by those skilled in the art of the present invention that the systems and methods of the present invention can be used with or without identifying a module. Thus the invention will be useful in providing a simple electronic tether comprising a single alert module and a single monitoring module. Further, although the claims herein discuss the electronic tether in terms of a single monitoring module, this is not meant as a limitation. The present invention anticipates that multiple monitoring modules are to be used in preferred embodiments, the number of which will vary depending on the size of the alert module and production costs. Additionally, the systems and methods may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

We claim:

1. An electronic tether for an animal comprising:
  an animal worn monitoring module comprising a portable transmitter adapted for transmitting a signal, wherein monitoring module further comprises a first clock and the audio signal comprising a first clock time $T_1$ as measured by the first clock at the time of transmission of the signal; and
  an alert module comprising a receiver wirelessly connected to the portable transmitter and a second clock, wherein the receiver is adapted to receive the signal from the transmitter, wherein the first clock and the second clock are referenced to a common time $T_0$ and wherein the alert module is adapted to:
    receive the signal from the monitoring module, wherein the signal is received at time $T_2$;
    determine a signal propagation time indicative of the time for the signal to reach the alert module from the monitoring module, wherein the signal propagation time is equal to $T_2-T_1$;
    determine a separation distance between the animal worn monitoring module and the alert module based on the propagation time and a propagation speed of the signal, and
    issue an alert when the separation distance exceeds a predetermined threshold.

2. The electronic tether for an animal of claim 1, wherein the portable transmitter is an RF transmitter.

3. The electronic tether for an animal of claim 1, wherein the portable transmitter is an audio transmitter.

4. A method for monitoring an animal using electronic tether comprising:
  sending a signal from an animal worn monitoring module, wherein the signal comprises a first clock time $T_1$ as measured by a first clock in the monitoring module at the time of transmission of the signal;
  receiving the signal from the animal worn monitoring module at an alert module;
  determining an arrival time $T_2$ of the signal at the alert module as measured by a second clock in the alert module, wherein the first clock and the second clock are referenced to a common time $T_0$;
  determining a signal propagation time indicative of the time for the signal to reach the alert module from the monitoring module, wherein the signal propagation time is equal to $T_2-T_1$;
  determining a separation distance between the animal worn monitoring module and the alert module based on the propagation time and a propagation speed of the signal; and
  issuing an alert when the separation distance exceeds a predetermined threshold.

5. The method of claim 4, wherein the signal is generated by an audio transmitter.

6. The method of claim 4, wherein the signal is generated by a RF transmitter.

7. A method for monitoring object location using an electronic tether comprising:
  sending a signal from a monitoring module, wherein the signal comprises a first clock time $T_1$ as measured by a first clock in the monitoring module at the time of transmission of the signal;
  receiving the signal from the monitoring module at an alert module;
  determining an arrival time $T_2$ of the signal at the alert module as measured by a second clock in the alert module, wherein the first clock and the second clock are referenced to a common time $T_0$;
  determining a signal propagation time indicative of the time for the signal to reach the alert module from the monitoring module, wherein the signal propagation time is equal to $T_2-T_1$;
  determining a separation distance between the monitoring module and the alert module based on the propagation time and a propagation speed of the signal; and
  issuing an alert when the separation distance exceeds a predetermined threshold.

8. The method of claim 7, wherein issuing an alert when the separation distance exceeds a predetermined threshold level comprises issuing a visual alarm.

9. The method of claim 7, wherein issuing an alert when the separation distance exceeds a predetermined threshold level comprises displaying a text message.

10. The method of claim 7, wherein issuing an alert when the separation distance exceeds a predetermined threshold level comprises issuing a tactile alert.

11. The method of claim 7, wherein the signal is an RF signal.

12. The method of claim 7, wherein the signal is an audio signal.

13. The method of claim 7, wherein the monitoring device is used to monitored an object selected from the list consisting of a human, a non-human animal, an article of luggage, a computer, a package, and a container.

14. The method of claim 7, wherein issuing an alert when the separation distance exceeds a predetermined threshold level comprises issuing an audible alarm.

15. The method of claim 14, wherein issuing an audible alarm when the separation distance exceeds a predetermined threshold level comprises issuing a synthesized voice.

16. An electronic tether comprising:
  a monitoring module comprising a first clock, wherein the monitoring module is adapted to send a signal comprising a first clock time $T_1$ as measured by the first clock at the time of transmission of the signal; and an alert module comprising a second clock, wherein the first clock and the second clock are referenced to a common time $T_0$ and the alert module is adapted to:
- receive the signal from the monitoring module, wherein the signal is received at time $T_2$;
- determine a signal propagation time indicative of the time for the signal to reach the alert module from the monitoring module, wherein the signal propagation time is equal to $T_2-T_1$;
- determine a separation distance between the monitoring module and the alert module based on the propagation time and a propagation speed of the signal; and
- issue an alert when the separation distance exceeds a predetermined threshold.

17. The electronic tether of claim 16, wherein the signal is an RF signal.

18. The electronic tether of claim 16, wherein the signal is an audio signal.

19. The electronic tether of claim 16, wherein the monitoring device is used to monitored an object selected from the list consisting of a human, a non-human animal, an article of luggage, a computer, a package, and a container.

20. The electronic tether of claim 16, wherein the alert is an audible alarm.

21. The electronic tether of claim 20, wherein the audible alarm is a synthesized voice.

22. The electronic tether of claim 16, wherein the alert is a visual alarm.

23. The electronic tether of claim 22, wherein the visual alarm is a text.

24. An anti-theft alert device comprising:
- a monitoring module comprising a portable transmitter adapted for transmitting an audio signal, wherein the monitoring module further comprises a first clock and the audio signal comprising a first clock time $T_1$ as measured by the first clock at the time of transmission of the signal; and
- an alert module comprising a receiver wirelessly connected to the portable transmitter and a second clock, wherein the receiver is adapted to receive the signal from the transmitter, wherein the first clock and the second clock are referenced to a common time $T_0$ and wherein the alert module is adapted to:
  - receive the signal from the monitoring module, wherein the signal is received at time $T_2$;
  - determine a signal propagation time indicative of the time for the signal to reach the alert module from the monitoring module, wherein the signal propagation time is equal to $T_2-T_1$;
  - determine a separation distance between the monitoring module and the alert module based on the propagation time and a propagation speed of the signal, and
  - issue an alert when the separation distance exceeds a predetermined threshold.

25. The electronic tether of claim 24, wherein the portable transmitter is an RF transmitter.

26. The electronic tether of claim 25, wherein the transmitter is a audio transmitter.

27. The electronic tether of claim 24, wherein the alert is an audible alarm.

28. The electronic tether of claim 27, wherein the audible alarm is a synthesized voice.

29. The electronic tether of claim 24, wherein the alert is a visual alarm.

30. The electronic tether of claim 29, wherein the visual alarm is a text message.

* * * * *